US008019745B2

(12) United States Patent
Lee (10) Patent No.: US 8,019,745 B2
(45) Date of Patent: Sep. 13, 2011

(54) DATA RETRIEVAL FROM A PLURALITY OF DISTINCT STORAGE DEVICES USING AN INDEX VALUE

(75) Inventor: Garrett Oren Lee, Spokane, WA (US)

(73) Assignee: Ciena Corporation, Linthicum, MD (US)

( * ) Notice: Subject to any disclaimer, the term of this patent is extended or adjusted under 35 U.S.C. 154(b) by 590 days.

(21) Appl. No.: 12/103,855

(22) Filed: Apr. 16, 2008

(65) Prior Publication Data

US 2009/0265310 A1    Oct. 22, 2009

(51) Int. Cl.
G06F 7/00      (2006.01)
G06F 17/30     (2006.01)
(52) U.S. Cl. .......................... 707/707; 707/723
(58) Field of Classification Search .............. None
See application file for complete search history.

(56) References Cited

U.S. PATENT DOCUMENTS

| 6,279,040 | B1 * | 8/2001 | Ma et al. ................. 709/231 |
| 7,599,949 | B1 * | 10/2009 | Plasek et al. ................ 1/1 |
| 2002/0143741 | A1 * | 10/2002 | Laiho et al. ................. 707/1 |
| 2002/0147717 | A1 * | 10/2002 | Barros et al. ................ 707/7 |
| 2003/0235188 | A1 * | 12/2003 | Varma et al. ............... 370/379 |

* cited by examiner

*Primary Examiner* — Uyen T. Le
(74) *Attorney, Agent, or Firm* — Clements Bernard PLLC; Christopher L. Bernard; Lawrence A. Baratta, Jr.

(57) ABSTRACT

A first processor receives a request for records from a requester. The records include an index field and the records are stored in a plurality of storage devices associated respectively with a plurality of second processors. Individual storage devices of the plurality of storage devices are physically distinct from one another. Subsequent to the receiving of the request, the first processor retrieves the records from the plurality of storage devices using the plurality of second processors. The first processor then arranges the retrieved records in an order based at least on the index field and provides the retrieved records to the requestor in the order.

25 Claims, 8 Drawing Sheets

DATA RETRIEVAL FROM A PLURALITY OF DISTINCT STORAGE DEVICES USING AN INDEX VALUE

TECHNICAL FIELD

The present invention, in various embodiments, relates to data retrieval from a plurality of distinct storage devices using an index value.

BACKGROUND OF THE INVENTION

Some packet switches have a chassis and multiple blades removably connected to the chassis. Some of these blades may be input/output blades that may send packets to other devices connected to the packet switch and may receive packets from the other devices. Other blades, referred to as control blades, may configure the input/output blades and may interact with a user and/or a network management system. In some configurations, each input/output blade of a packet switch may include a storage device configured to store information. In some configurations, the input/output blades may derive the information from packets received by the input/output blades.

At times, the packet switch may need to provide the information stored in each of the storage devices to a user or management system. Furthermore, the packet switch may need to provide the information in a particular order. According to one approach, a control blade may duplicate the information stored in the storage devices of the input/output modules, store the duplicate information in the control blade, and then sort the duplicate information according to the particular order. However, duplicating the information and storing the duplicate information in the control blade may be slow and may require a large amount of memory, thereby increasing the cost of the control blade.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

According to one aspect of the invention, a record retrieval method includes a first processor receiving a request for records. The request may comprise a plurality of messages including Simple Network Management Protocol (SNMP) get next requests.

The records include an index field and are stored in a plurality of storage devices associated respectively with a plurality of second processors. Individual storage devices of the plurality of storage devices are physically distinct from one another. A second one of the records may immediately follow a first one of the records according to the order. The first one of the records may be stored in a first storage device of the plurality and the second one of the records may be stored in a second storage device of the plurality.

The method also includes, subsequent to the receiving of the request, the first processor retrieving the records from the plurality of storage devices using the plurality of second processors, and arranging the retrieved records in an order based at least on the index field. In some cases, the records may include an additional index field and the arranging of the retrieved records in the order may be based on both the index field and the additional index field.

The method also includes providing the retrieved records in the order. Providing the retrieved records may include transmitting the retrieved records in the order or writing the retrieved records to a file in the order and providing access to the file.

Figure 1:
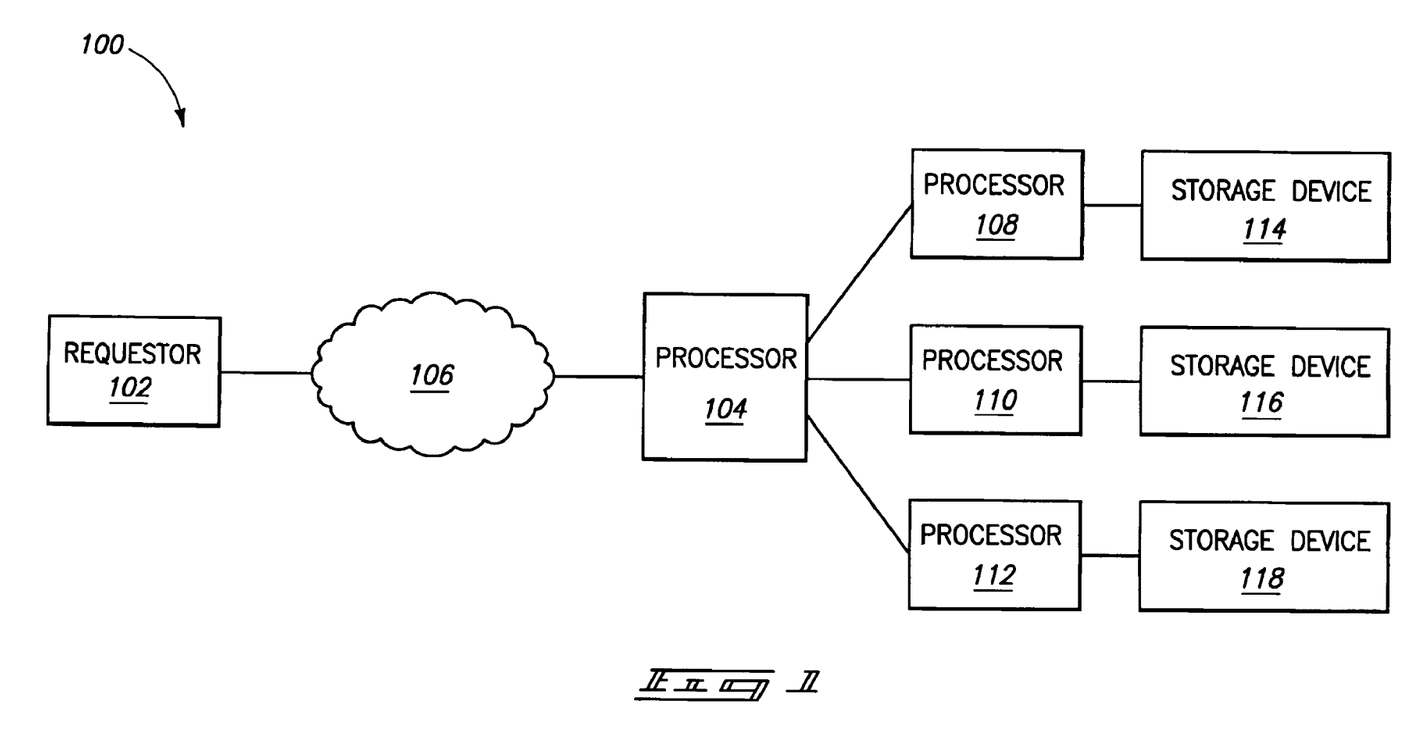
FIG. 1 is a block diagram of a data retrieval system.

Referring to FIG. 1, a data retrieval system 100 is illustrated. System 100 includes a requester 102; four processors 104, 108, 110, and 112; and three storage devices 114, 116, and 118. System 100 may also include network 106.

Storage devices 114, 116, and 118 may individually be embodied in a number of different ways using electronic, magnetic, optical, electromagnetic, or other techniques for storing information. Some specific examples of storage devices include, but are not limited to, a portable magnetic computer diskette (such as a floppy diskette or a ZIP® disk manufactured by the Iomega Corporation of San Diego, Calif.), disk, hard drive, random access memory, read only memory, flash memory, cache memory, and/or other configurations capable of storing programming, data, or other digital information.

Storage devices 114, 116, and 118 may be physically distinct relative to one another. For example, storage device 114 may be a first integrated circuit located on one printed circuit board and storage device 116 may be a second integrated circuit located on a different printed circuit board. By way of another example of being physically distinct, storage device 114 may have an addressing scheme that is independent of an addressing scheme associated with storage device 116. For example, a value may be stored at an address within storage device 114 and a different value may be stored at the same address within storage device 116.

Storage devices 114, 116, and 118 may store records containing data. A record may have a single field in which a single data value is stored or may have several different fields, each storing different data values relative to one another. The fields of a record may be arranged within the record according to a record format.

One of the fields of the record may be referred to as an index field. The index field may be used in arranging a set of records in an order. For example, values of index fields of a set of records may be numeric values. Using the values of the index fields, the set of records may be arranged in numerical order, from the smallest numerical value to the largest numerical value, that is, in ascending order. Alternatively, the set of records may be arranged in numerical order, from the largest numerical value to the smallest numerical value, that is, in descending order.

A set of records may include records having index fields. Individual records of the set may have different index values in their index fields relative to one another. Storage device 114 may store a first subset of the set, storage device 116 may store a second subset of the set, and storage device 118 may store a third subset of the set. The index values of the records of the first subset need not have any relationship to the index values of the records of the second subset. For example, the index values of the records of the first subset need not be within a first range of values and the index values of the records of the second subset need not be within a second range of values that is non-overlapping with the first range of values.

In some configurations, storage device 114 may store a first record having a first index value and storage device 116 may store a second record also having the first index value. The first and second records may be duplicates. Alternatively, the first and second records may both include the first index value but may have values stored in another field of the records that are different from each other.

Processors 104, 108, 110, and 112 may be individually configured to execute executable instructions including, for example, software and/or firmware instructions. Processors 108, 110, and 112 may be associated respectively with storage devices 114, 116, and 118 and processors 104, 108, 110, and 112 may be physically distinct relative to one another. By way of example, processor 108 may be located within the same computer, blade, module, or printed circuit board as storage device 114 but might not be located within the same computer, blade, module, or printed circuit board as processor 104. In one configuration, processor 104 may be part of a first computer, processor 108 and storage device 114 may be part of a second computer, processor 110 and storage device 116 may be part of a third computer, and processor 112 and storage device 118 may be part of a fourth computer.

Alternatively, processors 108, 110, and 112 may be logically distinct relative to one another. For example, processors 108, 110, and 112 may be virtual processors implemented as virtual threads different from one another on a single physical processor.

Requestor 102 may request the set of records stored by storage devices 114, 116, and 118 from processor 104. Furthermore, the request may ask that the records be provided in an order based on the index field (e.g., in numerical order based on the index field). In some configurations, requester 102 may be a device configured to communicate with processor 104 such as a computer or network management device. Requestor 102 may communicate with processor 104 via network 106. Thus, requestor 102 need not be physically proximate to processor 104. By way of example, requester 102 may communicate with processor 104 using one or more SNMP commands and/or one or more command line interface commands.

Upon receiving the request from requester 102, processor 104 may retrieve the records. In some configurations, processor 104 might not retrieve the records directly from storage devices 114, 116, and 118. Instead, to retrieve records stored by storage device 114, processor 104 may request that processor 108 retrieve the records from storage device 114 and then provide the records to processor 104. Similarly, processor 104 may retrieve records stored by storage device 116 via processor 110 and records stored by storage device 118 via processor 112.

Processor 104 may arrange the retrieved records in an order based on the index fields. For example, if the values of the index fields of the records are numerical, processor 104 may arrange the records in numerically ascending order. Processor 104 may provide the records to requester 102 in the order. In some configurations, processor 104 may transmit the records to requester 102 (e.g., via network 106). In other configurations, processor 104 may write the records to a file and requester 102 may retrieve the file (e.g., via network 106) after the file has been written.

According to another aspect of the invention, a packet switch includes a plurality of input/output modules and a control module. The plurality of input/output modules and the control module may be physically distinct from one another. Individual input/output modules of the plurality include different storage devices relative to one another and include different ports relative to one another. The input/output modules are configured to receive Ethernet packets having addresses using the ports and to store the addresses in the storage device.

The control module is in communication with the plurality of input/output modules and is configured to receive a request for the addresses from a requester. The control module is also configured to retrieve the addresses from the plurality of input/output modules in response to the request, arrange the addresses in an order, and provide the addresses to the requester in the order. The order may be a numerically ascending order.

Figure 2:
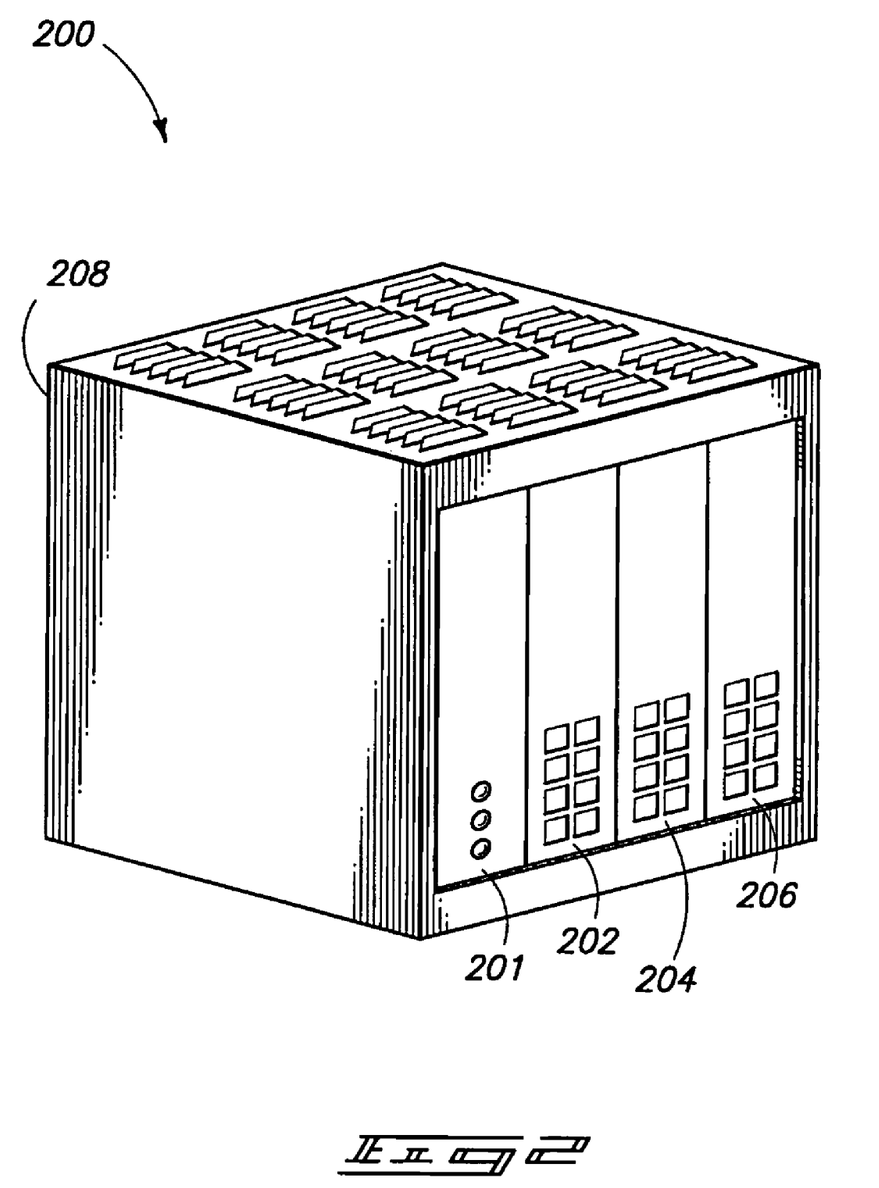
FIG. 2 is an isometric view of a packet switch.

Referring to FIG. 2, an isometric view of an example physical configuration of a packet switch 200 is illustrated. Packet switch 200 includes a control module 201, three input/output modules 202, 204, and 206, and a chassis 208.

Chassis 208 may house control module 201 and input/output modules 202, 204, and 206, may provide power to the modules, and may provide connectivity between the modules. The modules may be removably installed in chassis 208 so that a faulty module may be replaced. In one configuration, an individual module may be removed from chassis 208 without interrupting operation of other modules housed by chassis 208.

In one configuration, as illustrated in FIG. 2, control module 201 and input/output modules 202, 204, and 206 may be physically distinct relative to one another. Accordingly, control module 201 may be physically separated from chassis 208 without separating any of input/output modules 202, 204, or 206 from chassis 208.

Of course, other physical configurations are also possible. For example, control module 201 may be located in a first chassis along with input/output modules 202 and 204 and input/output module 206 may be located in a second chassis.

Input/output modules 202, 204, and 206 may include different ports (e.g., Ethernet ports) relative to one another. The ports may send and receive packets (e.g., Ethernet packets) and packet switch 200 may forward a packet received on one port of one of input/output modules 202, 204, and 206 to one or more other ports of input/output modules 202, 204, and/or 206.

Figure 3:
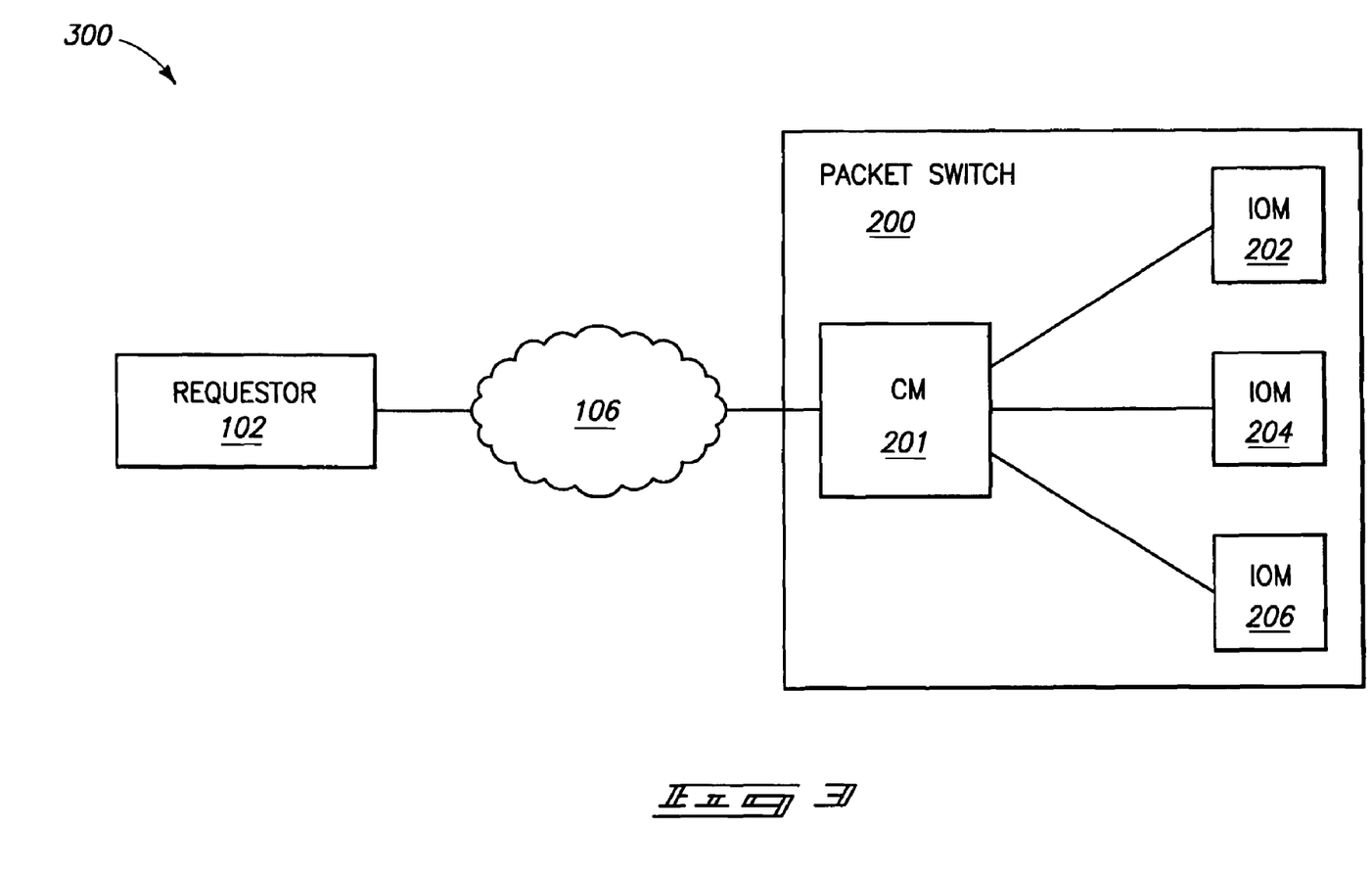
FIG. 3 is a block diagram of another data retrieval system.

Referring to FIG. 3, a block diagram of a data retrieval system 300 is illustrated. System 300 includes requester 102 and network 106 (both described above in relation to FIG. 1) and packet switch 200. Packet switch 200 includes control module (CM) 201 and input/output modules (IOMs) 202, 204, and 206.

Figure 4:
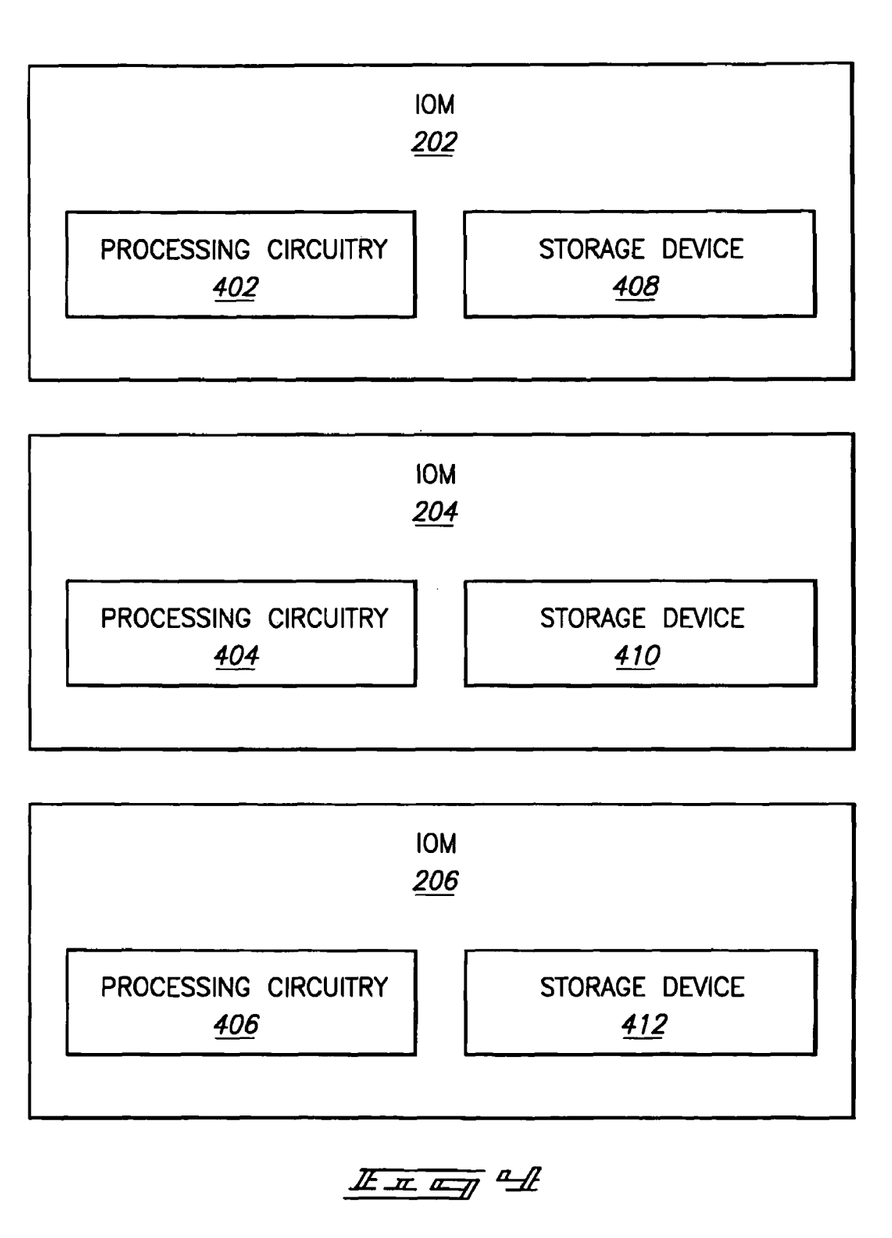
FIG. 4 is a set of block diagrams of input output modules.

Referring to FIG. 4, block diagrams of IOMs 202, 204, and 206 are illustrated. IOM 202 includes processing circuitry 402 and storage device 408, IOM 204 includes processing circuitry 404 and storage device 410, and IOM 206 includes processing circuitry 406 and storage device 412.

Storage devices 408, 410, and 412 may individually be embodied in a number of different ways using electronic, magnetic, optical, electromagnetic, or other techniques for storing information. Some specific examples of storage devices include, but are not limited to, a portable magnetic computer diskette (such as a floppy diskette or a ZIP® disk manufactured by the Iomega Corporation of San Diego, Calif.), disk, hard drive, random access memory, read only memory, flash memory, cache memory, and/or other configurations capable of storing programming, data, or other digital information.

In at least one embodiment, processing circuitry 402, 404, and 406 may individually comprise circuitry configured to implement desired programming provided by appropriate media in at least one embodiment. For example, processing circuitry 402, 404, and 406 may be individually implemented as one or more of a processor and/or other structure configured to execute executable instructions including, for example, software and/or firmware instructions, and/or hardware circuitry. Exemplary embodiments of processing circuitry 402, 404, and 406 include hardware logic, FPGA, ASIC, state machines, and/or other structures alone or in combination with a processor. These examples of processing circuitry 402, 404, and 406 are for illustration and other configurations are possible.

IOM 202 may receive a packet (e.g., an Ethernet packet) on a port of IOM 202. In response to receiving the packet, processing circuitry 402 may learn an address of the packet. Learning the address may include extracting the address (e.g., a source Medium Access Control (MAC) address) from the packet and storing the address in storage device 408. IOM 202 may extract addresses from many packets received by IOM 202 and may store the extracted addresses in storage device 408. In some configurations, storage device 408 may store hundreds of thousands of extracted addresses.

Similarly, processing circuitry 404 may extract addresses from packets received by IOM 204 and store the extracted addresses in storage device 410 and processing circuitry 406 may similarly extract addresses from packets received by IOM 206 and store the extracted addresses in storage device 412.

Returning now to FIG. 3, requester 102 may request the addresses stored in IOMs 202, 204, and 206 and may request that the addresses be provided in an order (e.g., in increasing numerical order by address). CM 201 may receive the request from requester 102 and in response may retrieve the addresses stored by IOMs 202, 204, and 206. CM 201 may arrange the addresses in numerical order (e.g., in increasing numerical order) and provide the addresses to requester 102.

Of course, IOMs 202, 204, and 206 may extract addresses other than MAC addresses (e.g., Internet Protocol (IP) addresses) from received packets and/or may extract other information from the received packets. The extracted information may be stored in storage devices 408, 410, and 412 and may be retrieved and arranged by CM 201 using the method described above. The method of retrieval and arrangement described above is not limited to address data extracted from packets. Indeed, control module 201 may retrieve and arrange substantially any records stored by storage devices 408, 410, and 412 having a common index field.

CM 201 may use one or more of a variety of techniques in retrieving records from storage devices 408, 410, and 412 and in arranging the retrieved records in an order. Some of these techniques are described below.

According to another aspect of the invention, a record retrieval method includes providing a plurality of storage devices. Individual storage devices of the plurality store different subsets of a set of records relative to one another and individual storage devices of the plurality are physically distinct from one another. In some configurations, none of the storage devices of the plurality may store the entire set of records. Every record includes an index value. In some configurations, the index values of each of a first plurality of the records of the set may be the same and the index values of each of a second plurality of the records of the set may be different. In other configurations, the index values of each of the records of the set may be different.

The method also includes receiving a request for the record of the set whose index value is both ordinally subsequent to a request value and ordinally nearest the request value. The request may include the request value.

The method also includes subsequent to the receiving of the request, retrieving from each of at least two of the storage devices of the plurality, a record of the subset stored by the storage device whose index value is both ordinally subsequent to the request value and ordinally nearest the request value. The retrieving may include requesting of each of the storage devices of the plurality the record of the subset stored by the storage device whose index value is both ordinally subsequent to the request value and ordinally nearest the request value.

The method also includes selecting a record from among the retrieved records, the selected record being ordinally nearest the request value. The selecting may include selecting after a particular amount of time has expired since the requesting or selecting after each of the storage devices of the plurality has provided the record of the subset stored by the storage device whose index value is both ordinally subsequent to the request value and ordinally nearest the request value.

In some configurations, the index values and the request value may be numeric and the index value of the selected record may be larger than the request value and closer to the request value than the index values of the retrieved records that were not selected. In other configurations, the index values and the request value may be time values and the index value of the selected record may be chronologically later than the request value and may be closer in time to the request value than the index values of the retrieved records that were not selected.

In some configurations, the method may also include, subsequent to the selecting, retrieving an additional record from the storage device of the plurality from which the selected record was retrieved. The index value of the additional record may be both ordinally subsequent to the index value of the selected record and ordinally nearest the index value of the selected record and the additional record may belong to the subset stored by the storage device from which the selected record was retrieved.

The request may be referred to as a first request, the selected record may be referred to as a first selected record, and the method may further include, subsequent to the receiving of the first request, receiving a second request for the record of the set whose index value is both ordinally subsequent to the index value of the first selected record and ordinally nearest the index value of the first selected record. The method may further include selecting a second selected record from among the retrieved records and the additional record, the second selected record being ordinally nearest the index value of the first selected record, and providing the second selected record.

The method may further include determining a particular amount of time has expired since the receiving of the request without receiving a request for the record of the set whose index value is both ordinally subsequent to the index value of the selected record and ordinally nearest the index value of the selected record and, responsive to the determining, discarding the retrieved records and the additional record.

According to another aspect of the invention, a packet switch includes a plurality of input/output modules and a control module. Individual input/output modules of the plurality include different storage devices relative to one another. Individual input/output modules of the plurality are configured to store a different subset of a set of records relative to one another. Every record includes an index value. Individual input/output modules of the plurality include different ports relative to one another. The input/output modules of the plurality may be further configured to transmit Ethernet packets on the ports, receive Ethernet packets on the ports, extract address data from the received Ethernet packets, and store the extracted address data in the set of records.

The control module is configured to receive a request for the record of the set whose index value is both ordinally subsequent to a request value and ordinally nearest the request value. The control module is also configured to, subsequent to receiving the request, retrieve from each of at least two of the storage devices of the plurality, a record of the subset stored by the storage device whose index value is both ordinally subsequent to the request value and ordinally nearest the request value. The control module is also configured to select a record from among the retrieved records, the selected record being ordinally nearest the request value, and provide the selected record.

Several examples describing retrieval and arrangement of records are described below.

Figure 5:
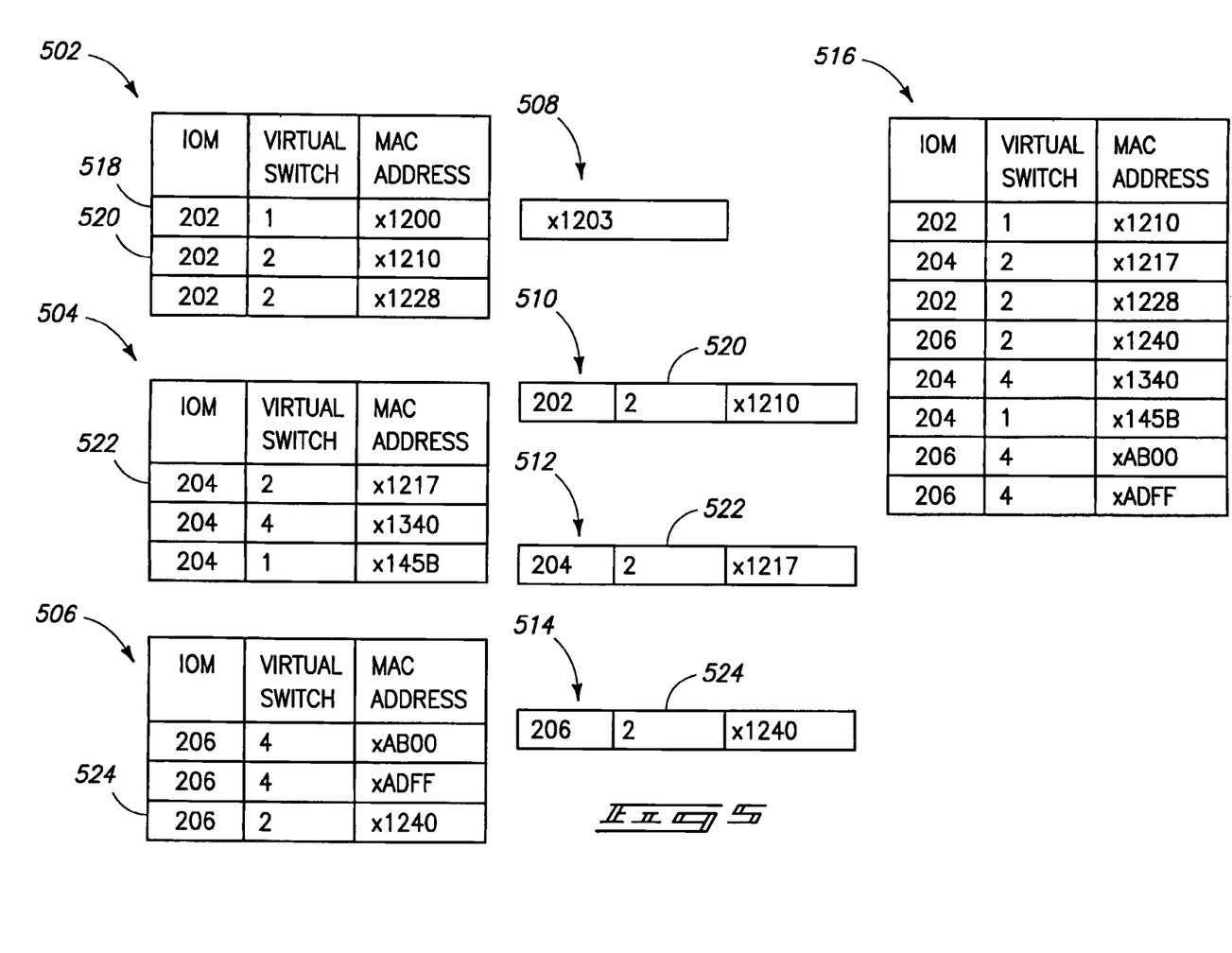
FIG. 5 is a chart illustrating example records.

FIG. 5 is a chart illustrating various records containing MAC addresses learned by IOMs 202, 204, and 206. Three subsets of records 502, 504, and 506; a request value 508; a set of three retrieved records 510, 512, and 514; and table of records 516 are illustrated.

Subsets 502, 504, and 506 are subsets of a set of records stored by packet switch 200. The records of subset 502 are stored by storage device 408 and contain MAC addresses learned from packets received by IOM 202. Individual records of subset 502 include a MAC address field containing a MAC address learned by IOM 202 in response to receiving a packet, an IOM field containing an identifier of the IOM that learned the MAC address, and a virtual switch field containing an identifier of a virtual switch associated with the packet. The records of subset 504 are stored by storage device 410 and contain MAC addresses learned from packets received by IOM 204 and the records of subset 506 are stored by storage device 412 and contain MAC addresses learned from packets received by IOM 206.

The MAC address values of FIG. 5 are depicted as four digit hexadecimal numbers for simplicity. Other MAC addresses may include more than four hexadecimal digits.

CM 201 may receive a request (e.g., from requester 102) that may include a request value (e.g., request value 508). The request value may be in substantially the same format as the index values of a set of records. For example, request value 508 is a four digit hexadecimal value and the index values of the records of FIG. 5 (which are the MAC addresses in this example) are also four digit hexadecimal values. The request may indicate that CM 201 is to determine which of the records stored within packet switch 200 have an index value that occurs "next" according to an order of values and to provide the record.

The retrieval and selection example depicted in FIG. 5 is based on an ascending numeric order of the index values (MAC addresses in this example) of the depicted records. Accordingly, the next possible index value (MAC address) after request value 508, according to the order, is x1204. Furthermore, the next possible index value after x1204 is x1205. Additional next possible index values may be similarly determined and an ordered list of the index values may be constructed (e.g., x1204, x1205, x1206, x1207, x1208, and so on).

Since packet switch 200 does not necessarily store records having every possible index value (MAC address) in the ordered list of index values, the "next" index value after request value 508 among index values of records stored by packet switch 200 might not be x1204. Instead, the "next" index value may be the index value of a record stored by packet switch 200 that is ordinally subsequent to request value 508 (occurring in the order after "x1203") and ordinally nearest request value 508.

Since CM 201 does not necessarily know on which of IOMs 202, 204, and 206 the "next" record is stored, CM 201 may request that IOM 202 provide the record from subset 502 that is ordinally subsequent to request value 508 and ordinally nearest request value 508.

In response to receiving the request, processing circuitry 402 of IOM 202 may search through the records of subset 502 (the records stored by storage device 408) and determine that record 520 is ordinally subsequent to request value 508 and ordinally nearest request value 508. Processing circuitry 402 may subsequently provide record 520 to CM 201. By way of example, processing circuitry 402 may notify CM 201 if subset 502 does not include a record ordinally subsequent to request value 508.

In some configurations, IOM 202 may include two databases. The first database may contain a snapshot of records stored by storage device 408 at a particular point in time. Processing circuitry 402 may search the records stored in the first database looking for the record ordinally subsequent to request value 508 and ordinally nearest request value 508. While processing circuitry 402 is searching through the first database, the first database may be locked so that records stored in the first database cannot be altered. While the first database is locked, the second database may be unlocked so that MAC addresses learned while the first database is locked may be stored in the second database.

In some configurations, after receiving the request, processing circuitry 402 may begin a timer and may lock the first database for the duration of the timer. If the timer expires before processing circuitry 402 receives a subsequent request from CM 201, processing circuitry 402 may unlock the first database. If a subsequent request is received before the timer expires, the first database may remain locked and processing circuitry 402 may restart the timer. Consequently, the timer may enable CM 201 to retrieve a plurality of records associated with the same snapshot in time from the first database. By way of example, the timer may have a duration of between a fraction of a second and a few seconds.

Note that record 518 of subset 502 has an index value (MAC address x1200) nearer to request value 508 (x1203) than the index value of record 520 (x1210) since the difference between x1203 and x1200 is three and the difference between x1210 and x1203 is seven. However, x1200 is not numerically subsequent to x1203 and therefore is not ordinally subsequent to request value 508. Accordingly, x1200 is not the "next" index value after request value 508.

The request that CM 201 sends to IOM 202 may include a first identifier and a second identifier. The first identifier may used to determine compatibility between CM 201 and IOM 202. For example, after receiving the request, IOM 202 may use the first identifier to determine that software and/or firmware executed by IOM 202 is compatible with software and/or firmware executed by CM 201. Conversely, IOM 202 may use the first identifier to determine that software and/or firmware executed by IOM 202 is not compatible with software and/or firmware executed by CM 201.

CM 201 may use the second identifier to distinguish between request responses. For example, CM 201 may send a request to IOM 202 containing the second identifier and may send a request to IOM 204 containing a third identifier. A request response sent by IOM 202 to CM 201 may include the second identifier and a request response sent by IOM 204 to CM 201 may include the third identifier. Consequently, upon receiving a request response, CM 201 may conclude that the request response was sent by IOM 202 if the request response includes the second identifier and may conclude that the request response was sent by IOM 204 if the request response includes the third identifier. In some configurations, the second identifier and/or the third identifier may be a random or pseudo-random number.

CM 201 may also request that IOM 204 provide the record from subset 504 that is ordinally subsequent to request value 508 and ordinally nearest request value 508. In response to receiving this request, processing circuitry 404 may provide record 522 to CM 201. Similarly, CM 201 may request that IOM 206 provide the record from subset 506 that is ordinally subsequent to request value 508 and ordinally nearest request value 508. In response to receiving this request, processing circuitry 406 may provide record 524 to CM 201.

Thus, CM 201 may retrieve three records 520, 522, and 524 respectively from IOMs 202, 204, and 206. These retrieved records form a set of retrieved records referred to as 510, 512, and 514 in FIG. 5. CM 201 may select one record from among the retrieved records using a method described below. In one configuration, CM 201 may proceed with selecting the one record after CM 201 has received a request response from each of the IOMs to which it sent a request. In another configuration, CM 201 may start a timer after sending the requests and may proceed with selecting the one record after expiration of the timer even if CM 201 has not yet received a request response from one or more of the IOMs to which it sent the requests. By way of example, the timer may have a duration of between a fraction of a second and a few seconds.

Next, CM 201 may select the record among the set of retrieved records 510, 512, and 514 that is ordinally nearest request value 508, namely retrieved record 510 (record 520), and provide retrieved record 510 (e.g., to requester 102).

In some configurations, requester 102 may want to retrieve all records stored on packet switch 200 that are ordinally subsequent to request value 508. Accordingly, in one configuration, in response to receiving retrieved record 510 from CM 201, requester 102 may request that CM 210 retrieve the "next" record after index value x1210 (the index value of retrieved record 510). Requestor 102 may repeat this method to receive all the records stored by packet switch 200 that are ordinally subsequent to request value 508. In another configuration, requester 102 may send a single request for a set of "next" records to CM 201 and CM 201 may internally break the single request into a plurality of "next" record requests.

Table 516 illustrates an example order in which the records of subsets 502, 504, and 506 that are subsequent to request value 508 may be provided to requester 102. Note that the records of table 516 are arranged in ascending numerical order based on the index field (MAC address) and that the virtual switch field values and IOM field values are not in numerically ascending order.

In some configurations, the method described above in relation to FIG. 5 may be used to provide other records stored by packet switch 200. The other records may be provided based on an index field other than a MAC address field. For example, the other records may include an index field having a time value (e.g., minute, hour, day, month, year, etc.) and CM 201 may provide the other records in chronological order.

Figure 6:
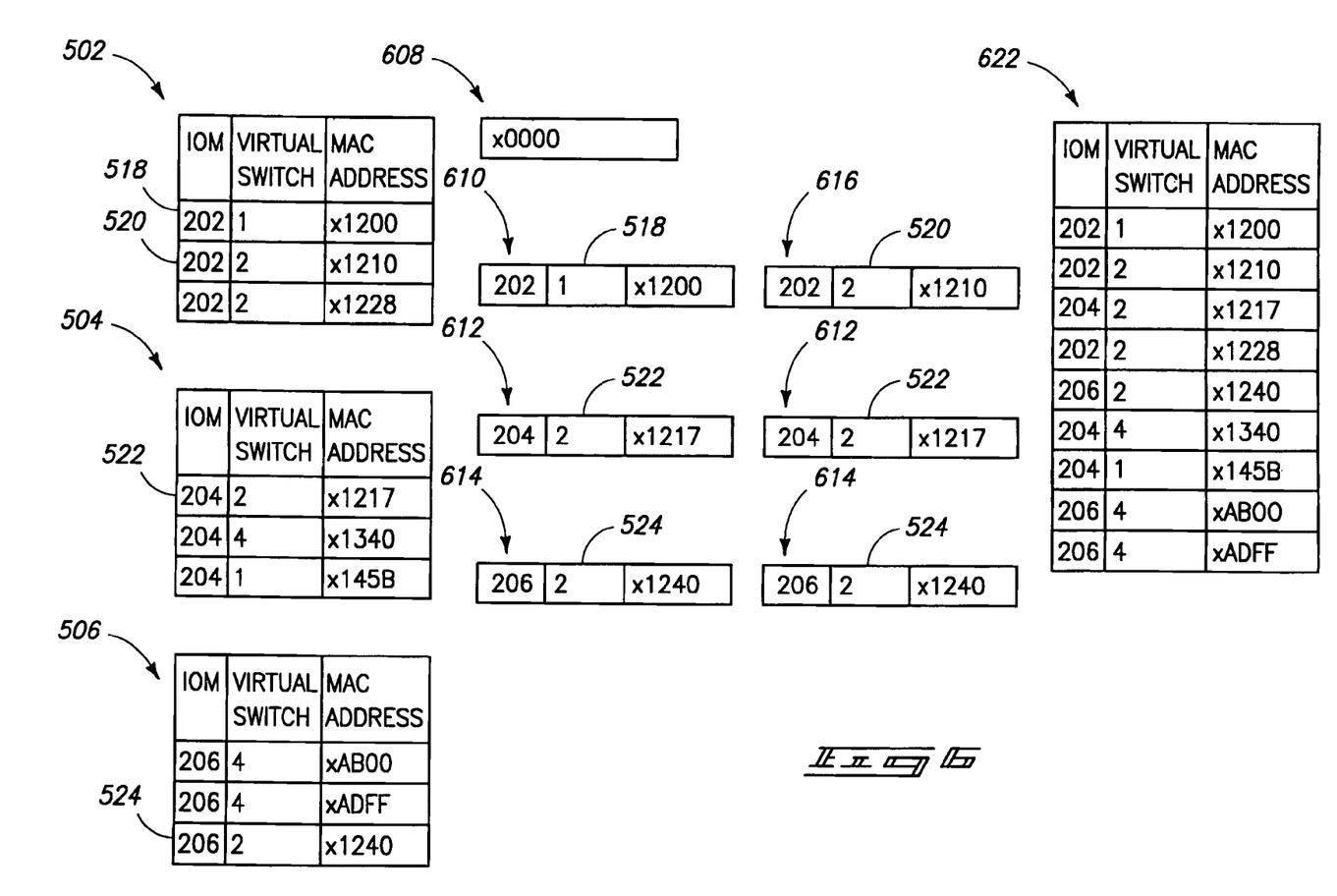
FIG. 6 is another chart illustrating example records.

FIG. 6 is a chart illustrating another example of record retrieval and selection. Subsets 502, 504, and 506 described above in relation to FIG. 5 are included in FIG. 6. A request value 608 is illustrated, as well as a first set of three retrieved values arranged in one column (retrieved values 610, 612, and 614) and a second set of three retrieved values arranged in another column (retrieved values 616, 612, and 614). A table of records 622 is also illustrated.

The example illustrated in FIG. 6 differs from the example illustrated in FIG. 5 in that the two examples have different request values. In addition, FIG. 6 illustrates two stages of record retrieval whereas FIG. 5 illustrates a single stage of record retrieval.

CM 201 may receive a request that may include request value 608 (x0000). Based on request value 608 and the method described above, CM 201 may retrieve record 518 from IOM 202 since the index value of record 518 (x1200) is ordinally subsequent to request value 608 and is ordinally nearer request value 608 than the index values of the other records of subset 502. In FIG. 6, record 518 is referred to as retrieved record 610. Similarly, CM 201 may retrieve record 522 from IOM 204 (retrieved record 612) and may retrieve record 524 from IOM 206 (retrieved record 614).

Next, CM 201 may select the record among the first set of retrieved records (610, 612, and 614) that is ordinally nearest request value 608 (x0000), namely retrieved record 610 (record 518) and provide retrieved record 610 (e.g., to requester 102).

In some configurations, the first set of retrieved records may be stored in a storage device (not illustrated) of CM 201. The storage device (e.g., volatile memory) may be configured to store only one retrieved record for each of the IOMs of packet switch 200 and thus storing the retrieved records may consume far less memory than the amount of memory consumed by storing subsets 502, 504, and 506 respectively in storage devices 408, 410, and 412.

After providing retrieved record 610, CM 201 may select the "next" record after x1200 (the index value of retrieved record 610). To do so, CM 201 may retrieve record 520 (also referred to as retrieved record 616) from IOM 202 since the index value of record 520 (x1210) is ordinally subsequent to the index value of record 518 (x1200) and is ordinally nearer the index value of record 518 than the index values of the other records of subset 502. In some configurations, CM 201 may store retrieved record 616 in the storage device of CM 201 described above instead of retrieved record 610.

CM 201 need not retrieve an additional record from IOM 204 since retrieved record 612 (previously retrieved from IOM 204) is necessarily the record of subset 504 that is ordinally subsequent to the index value of record 518 and ordinally nearest the index value of record 518. Similarly, CM 201 need not retrieve an additional record from IOM 206.

Together, retrieved records 616, 612, and 614 form the second set of retrieved records. CM 201 may select the record among the second set of retrieved records (616, 612, and 614) that is ordinally nearest the index value of record 518 (x1200), namely retrieved record 616 (record 520).

In some configurations, CM 201 may retrieve and select record 520 (retrieved record 616) prior to receiving a request for the "next" record after record 518. This operation is referred to herein as preselecting the "next" record. Preselecting may allow CM 201 to provide the "next" record after a request for the "next" record is received faster than if CM 201 waits to receive a request for the "next" record before selecting the "next" record. Thus, preselecting may be advantageous in situations in which CM 201 is likely to receive a series of requests for "next" records. In other configurations, CM 201 may retrieve record 520 but might not select record 520 from among retrieved records 616, 612, and 614 until after receiving a request for the "next" record.

CM 201 may start a timer upon receiving a first request. CM 201 may then select and provide a first record in response to the first request and subsequently select a second record in anticipation of receiving a second request. If the second request is not received prior to the timer expiring, CM 201 may discard the selected second record as well as other records retrieved from IOMs 202, 204, and 206 during the process of selecting the first and second records. If the retrieved records are stored in the storage device of CM 201 described above, the storage device may be purged upon expiration of the timer. By way of example, the timer may have a duration of between a fraction of a second and a few seconds.

In other configurations, instead of preselecting, CM 201 may wait to receive a request for a "next" record before retrieving or selecting the "next" record.

In some configurations, requester 102 may want to retrieve all records stored on packet switch 200 that are ordinally subsequent to request value 608. Consequently, CM 201 may receive a series of "next" record requests. Table 622 illustrates an order in which CM 201 may provide the records of subsets 502, 504, and 506 in response to receiving the series of requests. Note that in table 622 the records are arranged in ascending numerical order based on the index field (MAC address) and that the virtual switch field values and IOM field values are not in numerically ascending order.

In some configurations, the storage device of CM 201 need only simultaneously store one record for each IOM of packet switch 200 since, as was described above, CM 201 may consider one record from an IOM at a time. Storing one record for each IOM in CM 201 may be significantly less expensive than duplicating the records of subsets 502, 504, and 506 and storing the duplicate records in CM 201.

For example, in one configuration of packet switch 200, IOMs 202, 204, and 206 may each store 500,000 MAC address records. If CM 201 were to store duplicates of the MAC address records in a single central database on CM 201, the database would need to store 1,500,000 MAC address records. Doing so would require a storage device having a significant amount of capacity. Such a storage device would add cost to CM 201. Furthermore, a substantial amount of time and processing power would be spent adding records to the central database and purging records from the central database so that the records stored by the central database are the same as the records stored collectively by storage devices 408, 410, and 412.

Alternatively, storing learned MAC addresses in a central database on CM 201 instead of in storage devices 408, 410, and 412 could increase the amount of time spent learning MAC addresses since once an IOM learned a new MAC address it would need to communicate with CM 201 to store the learned MAC address in the central database. Furthermore, forwarding performance would be significantly degraded since the IOM would need to communicate with CM 201 in order to determine a destination for a packet using previously learned MAC addresses stored in the central database. Doing so would significantly increase the amount of time an IOM consumes in forwarding a packet thereby causing congestion and/or dropped packets.

However, using the methods described above in relation to FIGS. 5-6, CM 201 need only store a small set of retrieved records (e.g., retrieved records 616, 612, and 614). Thus, CM 201 need not have a large central database for storing records. Furthermore, using the methods described above, providing a set of records in an order may be faster than if a central database was used since the burden of searching through a storage device to find a "next" record is shared among the processing circuitry of several IOMs rather than being placed solely on CM 201.

Figure 7:
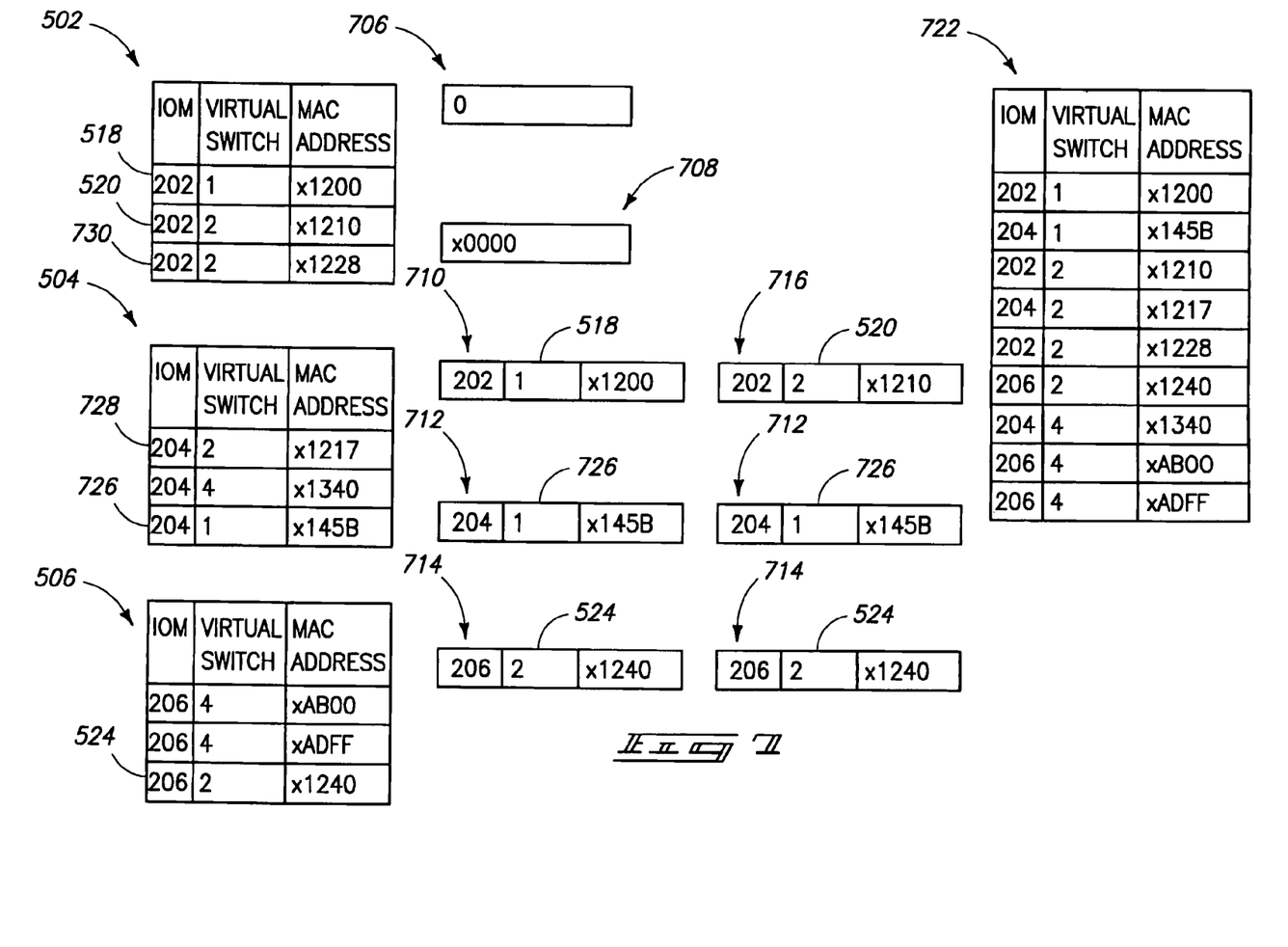
FIG. 7 is yet another chart illustrating example records.

FIG. 7 is a chart illustrating another example of record retrieval and selection. Subsets 502, 504, and 506 described above in relation to FIGS. 5-6 are included in FIG. 7. A first request value 706 and a second request value 708 are illustrated, as well as a first set of three retrieved records arranged in one column (retrieved records 710, 712, and 714) and a second set of three retrieved records arranged in another column (retrieved records 716, 712, and 714). A table of records 722 is also illustrated.

The example illustrated in FIG. 7 differs from the example illustrated in FIG. 6 in that CM 201 retrieves and selects records based on two index fields of the records and two request values rather than one index field and one request value. In the example of FIG. 7, CM 201 retrieves and selects records based first on the virtual switch field and second on the MAC address field.

CM 201 may receive a request including request value 706 (0) and request value 708 (x0000). Based on the request, CM 201 may retrieve record 518 from IOM 202 since the virtual switch identifier of record 518 (1) is ordinally subsequent to request value 706 and is ordinally nearer request value 706 than the virtual switch identifiers of the other records of subset 502. In FIG. 7, record 518 is referred to as retrieved record 710.

CM 201 may retrieve record 726 from IOM 204 since the virtual switch identifier of record 726 (1) is ordinally subsequent to request value 706 and is ordinally nearer request value 706 than the virtual switch identifiers of the other records of subset 504. In FIG. 7, record 726 is referred to as retrieved record 712.

Note that CM 201 retrieves record 726 rather than record 728 even though record 728 has a MAC address that is nearer request value 708 than the MAC address of record 726. In some configurations, IOMs might not consider the MAC address unless two records have the same virtual switch identifier. If two records have the same virtual switch identifier, IOM may select the record with the MAC address nearest request value 708.

Next, CM 201 may retrieve record 524 from IOM 206 based on the methods described above. Record 524 may be referred to as retrieved record 714.

Next, CM 201 may select the record among the first set of retrieved records (710, 712, and 714) that is ordinally nearest request value 706 (0). Since retrieved records 710 and 712 both have the same virtual switch identifier, CM 201 may select from among retrieved records 710 and 712 the record having a MAC address nearest request value 708, namely retrieved record 710 (record 518) and may provide retrieved record 710 (e.g., to requester 102).

After providing retrieved record 710, CM 201 may preselect the "next" record after record 518. To do so, CM 201 may retrieve record 520 (also referred to as retrieved record 716) from IOM 202 since the virtual switch value of record 520 (2) is ordinally subsequent to the virtual switch value of record 518 (1). Note that record 730 of subset 502 also has a virtual switch value of 2. IOM 202 may select from among records 520 and 730 by determining which of the records has a MAC address ordinally subsequent to and ordinally nearest request value 708, in this example, record 520. Record 520 may be referred to as retrieved record 716. As was described above, CM 201 need not retrieve an additional record from IOM 204 or IOM 206.

Together, retrieved records 716, 712, and 714 form the second set of retrieved records. Next, CM 201 may select the record among the second set of retrieved records (716, 712, and 714) that is ordinally nearest the virtual switch value of record 518, namely retrieved record 712 (record 726). If two or more records are equally near the virtual switch value of record 518, CM 201 may select the record having a MAC address nearest request value 708. Upon receiving a request for the "next" record after record 518, CM 210 may provide preselected retrieved record 712.

Table 722 illustrates an order in which CM 201 may provide the records of subsets 502, 504, and 506 in response to receiving a series of "next record" requests. Note that in table 722 the records are arranged in ascending numerical order based on the virtual switch field and that records having the same virtual switch value are arranged in ascending numerical order based on MAC address. Thus, CM 201 may provide records in an order based on two different index fields.

According to another aspect of the invention, a record retrieval method includes providing a plurality of storage devices. Individual storage devices of the plurality store different subsets of a set of records relative to one another and individual storage devices of the plurality are physically distinct from one another. Every record includes an index value. The method also includes receiving a request for the record of the set whose index value is equal to a request value and subsequent to the receiving of the request, retrieving from each of at least two of the storage devices of the plurality, a record of the subset stored by the storage device whose index value is equal to the request value. The retrieved records might not be identical.

The method may also include determining that at least one of the subsets stored by at least one of the storage devices of the plurality does not include a record having an index value equal to the request value.

The method also includes selecting one or more records from among the retrieved records and providing the selected one or more records. In some configurations, the selecting may include selecting all of the retrieved records and the providing may include providing all of the selected records.

Figure 8:
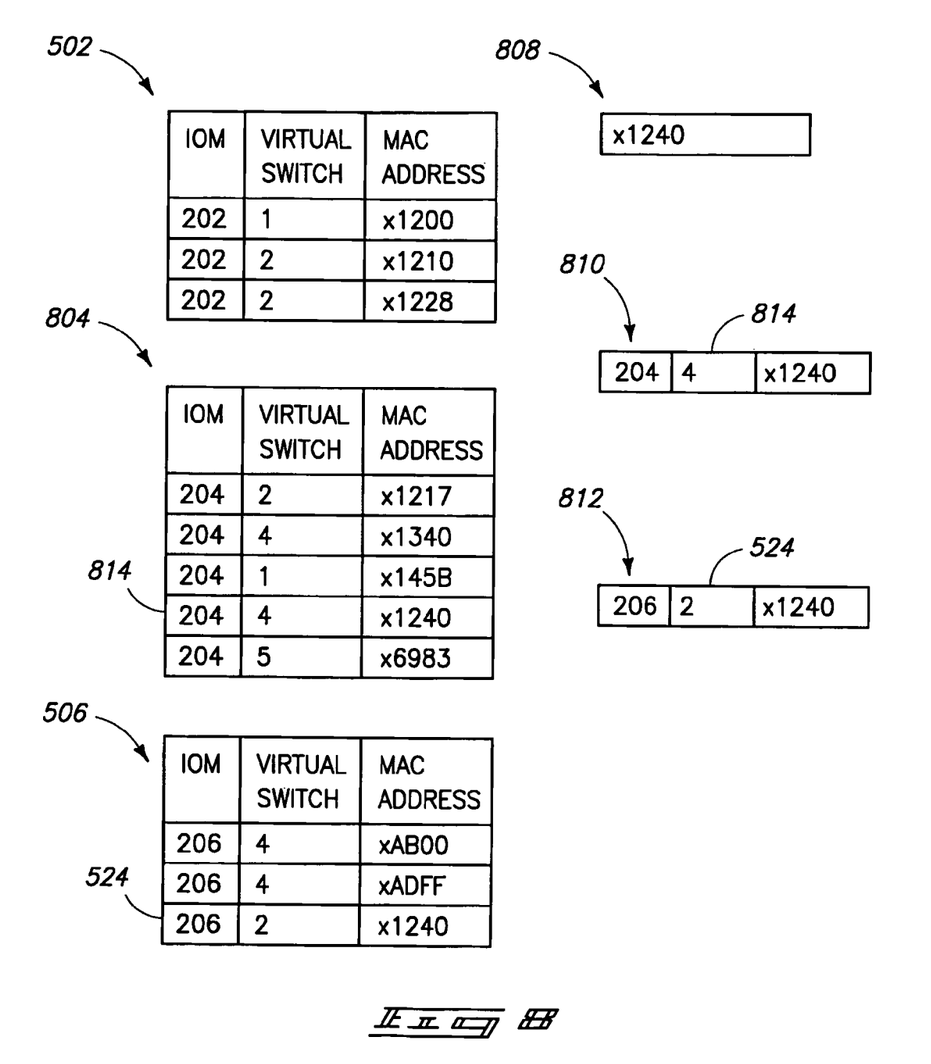
FIG. 8 is still another chart illustrating example records.

FIG. 8 is a chart illustrating various records related to MAC addresses learned by IOMs 202, 204, and 206. Three subsets of records 502, 804, and 506; a request value 808; and a set of two retrieved records 810 and 812 are illustrated.

The example illustrated in FIG. 8 differs from the examples described above in that FIG. 8 illustrates an example of CM 201 retrieving one more records having an index field matching a request value from one or more of IOMs 202, 204, and 206 rather than retrieving a record having an index field value that is ordinally subsequent to a request value as was described above in relation to FIGS. 5-7. To illustrate the method of retrieving records having an index field matching a request value, subset 804 is illustrated, by way of example, instead of subset 504. Subset 804 may be stored by IOM 204.

CM 201 may receive a request that may include a request value (e.g., request value 808). The request may indicate that CM 201 is to determine which of the records stored within packet switch 200 has an index value matching request value 808 and provide one or more of the matching records.

Since CM 201 does not necessarily know on which of IOMs 202, 204, and 206 a matching record may be stored, CM 201 may request that IOM 202 provide record(s) from subset 502 having a MAC address matching request value 808. In response to receiving this request, processing circuitry 402 of IOM 202 may search through the records of subset 502 (the records stored by storage device 408) and determine that no records of subset 502 have a MAC address matching request value 808. Processing circuitry 402 may subsequently notify CM 201 that no matching records are stored in storage device 408.

CM 201 may also request that IOM 204 provide the record(s) from subset 804 that have a MAC address matching request value 808. In response to receiving this request, processing circuitry 404 may provide record 814 to CM 201. Similarly, CM 201 may request that IOM 206 provide the record(s) from subset 506 that have a MAC address matching request value 808. In response to receiving this request, processing circuitry 406 may provide record 524 to CM 201.

Thus, CM 201 may retrieve records 814 and 524 (referred to respectively as retrieved records 810 and 812). Note that although retrieved records 810 and 812 both have the same MAC address, retrieved records 810 and 812 are not identical because they have different IOM values and different virtual switch values relative to one another. In some configurations, CM 201 may provide all records having a MAC address matching request value 808. For example, if the records having a MAC address matching request value 808 are not identical, CM 201 may provide all of the matching records. Consequently, CM 201 may provide both retrieved record 810 and retrieved record 812 (e.g., to requestor 102).

In other configurations, CM 201 may provide only one of a set of records having a MAC address matching request value 808. For example, if the records having a MAC address matching request value 808 are identical, CM 201 may provide only one of the matching records since providing all of the matching records may be redundant.

In some cases, packet switch 200 might not store a record having a MAC address matching request value 808. Accordingly, CM 201 may notify requestor 102 that no matching packets are stored by packet switch 200.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A record retrieval method comprising:
a first processor receiving a request for records, the records comprising an index field and the records being stored in a plurality of storage devices associated respectively with a plurality of second processors wherein individual storage devices of the plurality of storage devices are physically distinct from one another, wherein the first processor, the plurality of second processors, and the plurality of storage devices are each disposed in a same device, and wherein the request is for the records whose index value is both ordinally subsequent to a request value and ordinally nearest the request value;
subsequent to the receiving of the request, the first processor retrieving the records from the plurality of storage devices using the plurality of second processors;
arranging the retrieved records in an order based at least on the index field; and
providing the retrieved records in the order.

2. The method of claim 1 wherein:
a second one of the records immediately follows a first one of the records according to the order;
the first one of the records is stored in a first storage device of the plurality; and
the second one of the records is stored in a second storage device of the plurality.

3. The method of claim 1 wherein the providing of the retrieved records comprises transmitting the retrieved records in the order or writing the retrieved records to a file in the order and providing access to the file.

4. The method of claim 1 wherein the records comprise an additional index field and the arranging of the retrieved records in the order is based on both the index field and the additional index field.

5. The method of claim 1 wherein the request comprises a plurality of messages comprising Simple Network Management Protocol (SNMP) get next requests.

6. A packet switch comprising:
 a plurality of input/output modules, individual input/output modules of the plurality comprising different storage devices relative to one another and comprising different ports relative to one another, the input/output modules being configured to:
  receive Ethernet packets comprising addresses using the ports; and
  store the addresses in the storage devices; and
 a control module in communication with the plurality of input/output modules and configured to:
  receive a request for the addresses from a requester, wherein the request is for the addresses whose value is both ordinally subsequent to a request value and ordinally nearest the request value;
  in response to the request, retrieve the addresses from the plurality of input/output modules;
  arrange the addresses in an order, wherein to arrange comprises filtering out duplicate addresses with identical information and providing duplicate addresses with non-identical information, wherein duplicate addresses with non-identical information are arranged in the order based on another criterion; and
  provide the addresses to the requestor in the order.

7. The packet switch of claim 6 wherein the plurality of input/output modules and the control module are physically distinct from one another.

8. The packet switch of claim 6 wherein the order is a numerically ascending order.

9. A record retrieval method comprising:
 providing a plurality of storage devices, individual storage devices of the plurality storing different subsets of a set of records relative to one another and individual storage devices of the plurality being physically distinct from one another, wherein every record comprises an index value;
 receiving a request for the record of the set whose index value is both ordinally subsequent to a request value and ordinally nearest the request value;
 subsequent to the receiving of the request, retrieving from each of at least two of the storage devices of the plurality, a record of the subset stored by the storage device whose index value is both ordinally subsequent to the request value and ordinally nearest the request value; and
 selecting a record from among the retrieved records, the selected record being ordinally nearest the request value.

10. The method of claim 9 wherein the index values and the request value are numeric and the index value of the selected record is larger than the request value and is closer to the request value than the index values of the retrieved records that were not selected.

11. The method of claim 9 wherein the index values and the request value are time values and the index value of the selected record is chronologically later than the request value and is closer in time to the request value than the index values of the retrieved records that were not selected.

12. The method of claim 9 wherein the request comprises the request value.

13. The method of claim 9 wherein none of the storage devices of the plurality store the entire set of records.

14. The method of claim 9 wherein the index values of each of a first plurality of the records of the set are the same and the index values of each of a second plurality of the records of the set are different.

15. The method of claim 9 wherein the index values of each of the records of the set are different.

16. The method of claim 9 further comprising subsequent to the selecting, retrieving an additional record from the storage device of the plurality from which the selected record was retrieved, the index value of the additional record being both ordinally subsequent to the index value of the selected record and ordinally nearest the index value of the selected record and the additional record belonging to the subset stored by the storage device from which the selected record was retrieved.

17. The method of claim 16 wherein the request comprises a first request, the selected record comprises a first selected record, and further comprising:
 subsequent to the receiving of the first request, receiving a second request for the record of the set whose index value is both ordinally subsequent to the index value of the first selected record and ordinally nearest the index value of the first selected record;
 selecting a second selected record from among the retrieved records and the additional record, the second selected record being ordinally nearest the index value of the first selected record; and
 providing the second selected record.

18. The method of claim 16 further comprising:
 determining a particular amount of time has expired since the receiving of the request without receiving a request for the record of the set whose index value is both ordinally subsequent to the index value of the selected record and ordinally nearest the index value of the selected record; and
 responsive to the determining, discarding the retrieved records and the additional record.

19. The method of claim 9 wherein:
 the retrieving comprises requesting of each of the storage devices of the plurality, the record of the subset stored by the storage device whose index value is both ordinally subsequent to the request value and ordinally nearest the request value; and
 the selecting comprises selecting after a particular amount of time has expired since the requesting or selecting after each of the storage devices of the plurality has provided the record of the subset stored by the storage device whose index value is both ordinally subsequent to the request value and ordinally nearest the request value.

20. A packet switch comprising:
 a plurality of input/output modules, individual input/output modules of the plurality comprising different storage devices relative to one another wherein individual input/output modules of the plurality are configured to:
  store a different subset of a set of records relative to one another wherein every record comprises an index value; and
 a control module configured to:
  receive a request for the record of the set whose index value is both ordinally subsequent to a request value and ordinally nearest the request value;
  subsequent to receiving the request, retrieve from each of at least two of the storage devices of the plurality, a record of the subset stored by the storage device whose index value is both ordinally subsequent to the request value and ordinally nearest the request value;

select a record from among the retrieved records, the selected record being ordinally nearest the request value; and provide the selected record.

21. The packet switch of claim 20 wherein:

individual input/output modules of the plurality comprise different ports relative to one another; and the input/output modules of the plurality are further configured to transmit Ethernet packets on the ports, receive Ethernet packets on the ports, extract addresses from the received Ethernet packets, and store the extracted addresses in the set of records.

22. A record retrieval method comprising:

providing a plurality of storage devices, individual storage devices of the plurality storing different subsets of a set of records relative to one another and individual storage devices of the plurality being physically distinct from one another, wherein every record comprises an index value;

receiving a request for the record of the set whose index value is equal to a request value;

receiving a request for the record of the set whose index value is both ordinally subsequent to the request value and ordinally nearest the request value;

subsequent to the receiving of the request, retrieving from each of at least two of the storage devices of the plurality, a record of the subset stored by the storage device whose index value is equal to the request value; and selecting one or more records from among the retrieved records, the selected one or more records comprising index values equal to the request value.

23. The method of claim 22 further comprising, for each the selected one or more records comprising identical records, providing only one of the identical records.

24. The method of claim 22, further comprising, for each the selected one or more records comprising identical addresses in the records, providing each of the selected one or more records comprising identical addresses.

25. The method of claim 22 further comprising determining that at least one of the subsets stored by at least one of the storage devices of the plurality does not include a record having an index value equal to the request value.

* * * * *